(12) United States Patent
Lee

(10) Patent No.: US 9,461,756 B2
(45) Date of Patent: Oct. 4, 2016

(54) CALIBRATION APPARATUS AND METHOD OF TERMINAL IN WIRELESS COMMUNICATION SYSTEM

(71) Applicant: Samsung Electronics Co., Ltd., Gyeonggi-do (KR)

(72) Inventor: Young-Taek Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 40 days.

(21) Appl. No.: 14/639,344

(22) Filed: Mar. 5, 2015

(65) Prior Publication Data

US 2015/0256214 A1    Sep. 10, 2015

Related U.S. Application Data

(60) Provisional application No. 61/948,891, filed on Mar. 6, 2014.

(30) Foreign Application Priority Data

Sep. 22, 2014  (KR) ........................ 10-2014-0125833

(51) Int. Cl.
| | |
|---|---|
| H04B 1/44 | (2006.01) |
| H04B 17/14 | (2015.01) |
| H04B 1/10 | (2006.01) |
| H04B 1/525 | (2015.01) |
| H04B 1/48 | (2006.01) |
| H04B 17/10 | (2015.01) |

(52) U.S. Cl.
CPC .............. *H04B 17/14* (2015.01); *H04B 1/109* (2013.01); *H04B 1/525* (2013.01); *H04B 17/104* (2015.01); *H04B 2001/485* (2013.01)

(58) Field of Classification Search
CPC .... H04B 17/104; H04B 17/14; H04B 1/109; H04B 1/525
USPC .......................................................... 455/83
See application file for complete search history.

(56) References Cited

U.S. PATENT DOCUMENTS

| | | | |
|---|---|---|---|
| 8,150,350 B2 | 4/2012 | Pratt et al. | |
| 2007/0298733 A1* | 12/2007 | Cole ................... | H04B 17/101 455/114.2 |
| 2008/0280585 A1* | 11/2008 | Chen ...................... | H04B 1/30 455/338 |
| 2010/0022199 A1* | 1/2010 | Cole ..................... | H04B 17/14 455/77 |
| 2011/0299575 A1 | 12/2011 | Aoulad et al. | |

\* cited by examiner

*Primary Examiner* — Wesley Kim
*Assistant Examiner* — Raj Chakraborty
(74) *Attorney, Agent, or Firm* — The Farrell Law Firm, P.C.

(57) ABSTRACT

A method and apparatus for calibrating a terminal is provided. The apparatus includes a modem; a transmission chain configured to process a signal input from the modem and transmit the processed signal via an antenna; a reception chain configured to process a signal received via the antenna and transmit the processed signal to the modem; and a connector configured to connect an output of the transmission chain and an output of the reception chain via an envelope detector and a switch configured to turn on/off the envelope detector, calibrate a DC offset voltage and I and Q signals of the transmission chain by inputting a one-tone signal of 1 MHz into the transmission channel via the modem in a state where the envelope detector is turned on, and calibrate a second order input intercept point (IIP2) characteristic value by adjusting the signal input into the modem via the reception channel.

10 Claims, 4 Drawing Sheets

CALIBRATION APPARATUS AND METHOD OF TERMINAL IN WIRELESS COMMUNICATION SYSTEM

PRIORITY

This application claims priority under. 35 U.S.C. §119(a) to a U.S. Provisional Patent Application filed on Mar. 6, 2014 in the U.S. Patent & Trademark Office and assigned Ser. No. 61/948,891 and a Korean Patent Application filed on Sep. 22, 2014 in the Korean Intellectual Property Office and assigned Serial No. 10-2014-0125833, the entire contents of which are incorporated herein by reference.

BACKGROUND

1. Field of the Invention

The present invention relates to a method and an apparatus for calibrating a terminal in a wireless communication system, and more particularly, to a method and apparatus for calibrating a Second Order Input Intercept Point (IIP2) by a terminal in a wireless communication system.

2. Description of the Related Art

The number of frequency bands defined in the current 3rd Generation Partnership Project (3GPP) standard is 30 or more and the frequency bands are configured variously from 690 MHz to 2.7 GHz. Further, a Long Term Evolution (LTE) technology corresponding to the $4^{th}$ Generation wireless communication standard supports a larger amount of data transmission/reception without distortion in comparison with 3GPP. Accordingly, a terminal supporting LTE is required to function in networks of conventional 2G and 3G modes as well as in various frequency bands, where a free handover between the modes is needed. Further, one terminal is required to communicate with business operators in several countries through a link therebetween. That is, a terminal for current wireless communication is required to basically support a Multi Mode Multi Band (MMMB) function.

In order to support various modes and various bands, a communication terminal must include components of a Front End Module (FEM) in each frequency band, which results in complex terminal hardware and an increase in cost. Accordingly, there are efforts to simplify FEM components or implement a broadband solution.

Meanwhile, since a Surface Acoustic Wave (SAW) filter used by a reception side of a terminal may suppress a transmission output leakage signal or an interference signal other than a reception band, the use of a SAW filter may cause the least amount of deterioration in reception sensitivity. However, due to a problem such as complexity of hardware, the SAW filter cannot be used in all frequency bands of the reception side, and a current terminal does not use any filter other than a duplexer. However, when the reception side does not use the saw filter, an InterModulation Distortion 2 (IMD2) of a transmission leakage (TX leakage) signal is frequency down-converted to a baseband of the reception side and a Noise Figure (NF) capability of the reception side deteriorates. Accordingly, the IMD2 component due to the TX leakage signal is required to be as small as possible, which means as large an IIP2 as possible. The Input Intercept Point (IIP2) due to the IMD2 component is necessarily generated by nonlinearity and mismatching of a circuit and the size thereof may vary depending on a frequency or sample.

SUMMARY

The present invention has been made to address the above-mentioned problems and disadvantages, and to provide at least the advantages described below.

Accordingly, an aspect of the present invention is to provide a method and an apparatus for efficiently calibrating the IIP2 component.

In accordance with an aspect of the present invention, an apparatus for calibrating a terminal of a wireless communication system is provided. The apparatus includes a modem; a transmission chain configured to process a signal input from the modem and transmit the processed signal via an antenna; a reception chain configured to process a signal received via the antenna and transmit the processed signal to the modem; and a connector configured to connect an output of the transmission chain and an output of the reception chain via an envelope detector and a switch configured to turn on/off the envelope detector, calibrate a DC offset voltage and I and Q signals of the transmission chain by inputting a one-tone signal of 1 MHz into the transmission channel via the modem in a state where the envelope detector is turned on, and calibrate a second order input intercept point (IIP2) characteristic value by adjusting the signal input into the modem via the reception channel.

In accordance with another aspect of the present invention, a method of calibrating a terminal in a wireless communication system is provided. The method includes applying a sine wave signal of 1 MHz to a transmission chain of the terminal via a modem; turning on an envelope detector to connect the transmission chain and a reception chain and calibrate a DC offset voltage, an I signal, and a Q signal of the transmission chain; and calibrating a second order input intercept point (IIP2) characteristic value by turning off the envelope detector and controlling a signal input into the modem via the reception chain.

BRIEF DESCRIPTION OF THE DRAWINGS

The above and other aspects, features, and advantages of the present invention will be more apparent from the following detailed description, taken in conjunction with the accompanying drawings, in which.

DETAILED DESCRIPTION OF EMBODIMENTS OF THE PRESENT INVENTION

Figure 1:
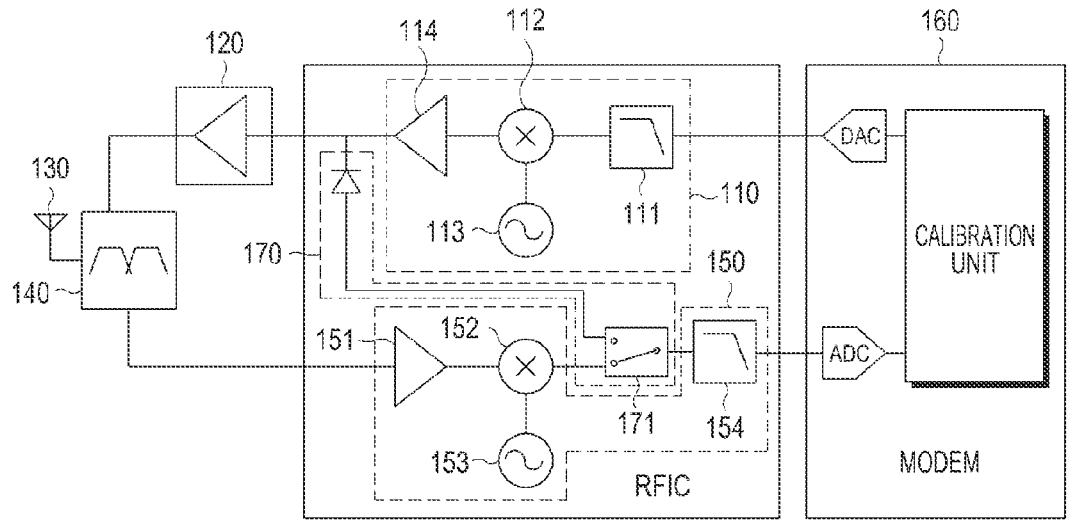
FIG. 1 is a schematic diagram of a transceiver within a terminal in a wireless communication system.

Hereinafter, embodiments of the present invention are described with reference to the accompanying drawings. It is noted that, where possible, the same reference numerals are designated to the same components in the accompanying drawings. Further, a detailed description of a known function and configuration which may make the subject matter of the present invention unclear is omitted.

Prior to the describing embodiments of the present invention, a relation between IIP2 and transmission (RX) sensitivity will be described below.

FIG. 1 is a schematic diagram of a transceiver within a terminal in a wireless communication system.

Referring to FIG. 1, a transceiver includes a transmission chain 110 that processes a frequency up conversion and filtering of a transmitted signal, a power amplifier 120 that amplifies power of a transmitted signal, an antenna 130, a duplexer 140, a reception chain 150 that processes a frequency down conversion and filtering of a received signal, a transmission/reception chain connector 170, and a modem 160. The transmission chain 110, the reception chain 150, and the transmission/reception chain connector 170 may be integrated into a Radio Frequency Integrated Circuit (RFIC).

The transmission chain 110 includes a baseband circuit 111, a mixer 112 that performs a frequency conversion, a local oscillator 113, and an amplifier 114. The reception chain 150 includes a Low Noise Amplifier (LNA) 151 that amplifies a received signal, a mixer 152 that synthesizes frequencies of a Radio Frequency (RF) signal and a Local Oscillation (LO) signal for a frequency down conversion, a local oscillator 153, and a baseband circuit 154. The mixer 152 receives an RF signal of a high frequency band received through the antenna 130, synthesizes the received RF signal with an LO signal, and outputs a BaseBand (BB) signal of a low frequency band, which corresponds to a frequency down conversion. Gain, noise, linearity, and power consumption of the mixer 152 are the main factors that determine the performance of the mixer 152. Further, in a Frequency Division Duplexer (FDD) system, such as a wireless communication system including a High Speed Packet Access (HSPA) system and a Long Term Evolution (LTE) system in which the transmission chain 110 and the reception chain 150 operate together, an influence of Inter-Modulation (IM) due to a transmission (TX) leakage signal flowing in the reception chain 150 from the transmission chain 110 through the duplexer 140 is one of the main factors that determines the performance of the mixer 152.

Meanwhile, in the related art, the transceiver as illustrated in FIG. 1 uses a SAW filter corresponding to a Surface Acoustic Wave filter between the LNA 151 and the mixer 152 to remove the TX leakage signal. However, the conventional receiver using the SAW filter is not preferable in that an external element is additionally required. Accordingly, current reception chains do not use a SAW filter and mainly use a passive switching mixer, having relatively small power consumption in comparison with an active switching mixer, and having high linearity from a viewpoint of 3rd-order nonlinearity. Further, since a Direct Current (DC) does not flow in the passive switching mixer, the passive switching mixer is relatively less influenced by flicker noise. However, there is still a reception sensitivity deterioration issue since 2nd-order nonlinearity or a Second-order Input Intercept Point (IIP2) characteristic of the passive switching mixer is determined by mismatch factors of a frequency down converter in the reception chain 150.

The IIP2 characteristic refers to a factor indicating linearity of a circuit. In general, a received signal may be distorted due to interference between channels having a small frequency difference or interference between signals in a signal band, and the IIP2 characteristic is defined to indicate linearity of a circuit via a relation between a distortion amount by IMD2 and an amplification amount of an input frequency among factors which distort the received signal. More specifically, when power of a received signal continuously increases in the receiver, power of an IMD2 distorted signal increases at a sharp incline, and a power point, at which the received signal and the IMD2 distorted signal are expected to intersect, as viewed from an input terminal of the receiver, is defined as the IIP2. Accordingly, in order to guarantee high linearity in a wireless communication system, a high IIP2 characteristic is required, which means minimum IMD2 distortion. Accordingly, the reception chain 150 should be designed to have a high value of a parameter indicating the IIP2 characteristic in the wireless communication system.

Causes of the IMD2 which determine the IIP2 characteristic in the mixer 152 are largely divided into three areas. The first area is the size of the mixer, which is determined by the size of its transistors, which have threshold voltage ($V_{TH}$) mismatches that depend on the size of the transistors. The second area is coupling of different leakage signals of an RF input and an LO input. The third area is LO signal path mismatching or LO AC-coupling mismatching. Accordingly, in order to optimize the IIP2 characteristic, the size of the mixer 152 may either be designed to be large or its layout symmetry and matching of the mixer's 152 transistors may be improved. However, in general, various IIP2 characteristic correcting methods for obtaining a stable IIP2 characteristic with respect to changes in Process, Voltage, and Temperature (PVT) without using the SAW filter have been researched.

Figure 2:
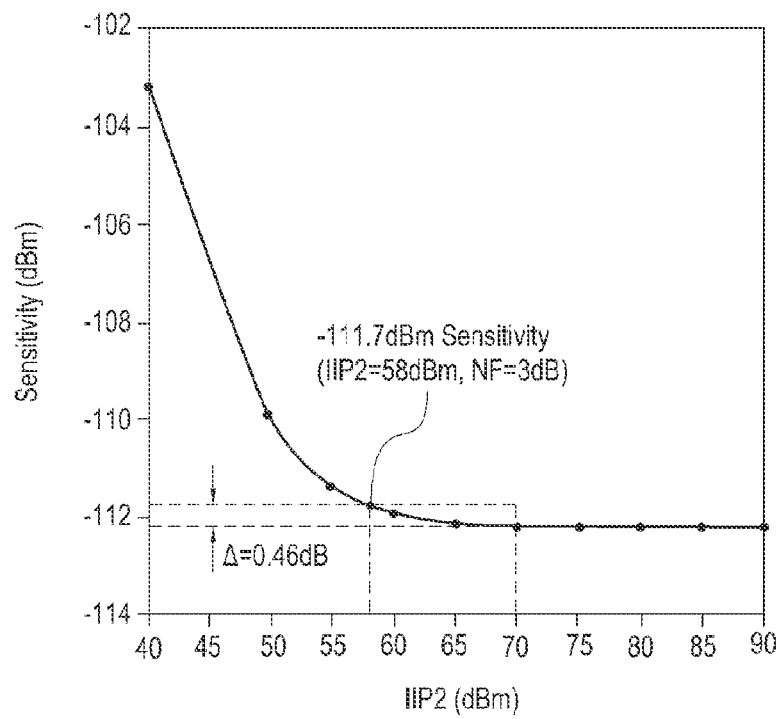
FIG. 2 is a graph illustrating an effect of IIP2 on reception (RX) sensitivity.

FIG. 2 is a graph illustrating an effect of IIP2 on reception (RX) sensitivity.

Referring to FIG. 2, when the IIP2 reaches a predetermined level, RX sensitivity deterioration due to IIP2 ceases (i.e., a reception is no longer sensitive to, or affected by, IIP2). When the IIP2 increases, but is less than or equal to 55 dBm, RX sensitivity to IIP2 gradually deteriorates. Accordingly, when the IIP2 is greater than or equal to 57 dBm, RX sensitivity deterioration is within 0.5 dB, so that a SAW filter of the reception side is not needed to remove the TX leakage signal.

Further, among RF FEM circuits (e.g. RFICs), there is a circuit to which IIP2 calibration is not applied. This is because the circuit can achieve an IIP2 performance resulting in an RX sensitivity within 0.5 dB without IIP2 calibration. Further, as the TX to RX isolation characteristic of the duplexer 140 improves, TX leakage decreases and thus IIP2 requirements may ease. However, as described above, terminals of the future will be required to support several frequency bands. Currently, since a FEM such as a duplexer 140 can be replaced with a tunable element, the TX to RX isolation characteristic is insufficient. Accordingly, there is a need for IIP2 calibration in an RFIC.

In general, a method of IIP2 calibration includes applying a two-tone sine wave in an RF frequency band to an input of an LNA. However, such a method has a disadvantage in that manufacturing process time and costs increase because separate external equipment must be used in a terminal manufacturing line to apply a two-tone sine wave to an LNA. Another method of IIP2 calibration includes generating a two-tone sine wave in a modem of a terminal and applying the generated two-tone sine wave to an RFIC. In order to apply the method, the hardware of the modem must be modified. Still another method of IIP2 calibration includes measuring and compensating for an IIP2 component in real time. The method has an advantage in that the calibration is adaptively performed according to a given environment (e.g., frequency, temperature, and signal intensity), but also has a disadvantage in that the size of an Integrated Circuit (IC), or chip, increases since time is required for the compensation and separate compensation circuits must be added to the modem and the RFIC.

Accordingly, an embodiment of the present invention provides a method and an apparatus for efficiently performing IIP2 calibration while minimizing hardware modification. To this end, an embodiment of the present invention provides a method of using mismatch calibration performed by the transmission chain 110 of the RFIC for IIP2 calibration of the reception chain of the RFIC.

First, IQ mismatch calibration and DC offset calibration performed by the transmission chain 110 will be described.

The RFIC has items to be calibrated due to mismatches generated during the manufacturing of the RFIC, and the transmission chain 110 performs IQ mismatch calibration and DC offset calibration (or carrier leakage calibration).

Carrier leakage is generated by a DC offset voltage of the transmission chain 110 of the RFIC. As the DC offset voltage increases, an LO leakage amount in an output of the transmission chain 110 of the RFIC increases. Accordingly, for the DC offset calibration, a one-tone sine wave signal of 1 MHz is applied to the input of the transmission chain 110 of the RFIC from a Digital-to-Analog Converter (DAC) output of the modem 160. Further, an envelope detector 171 of the transmission/reception chain connector 170 of the RFIC is turned on. The envelope detector 171 emits a sine wave of 1 MHz to an output of the reception chain 150 of the RFIC in proportion to the LO leakage amount and a Fast Fourier Transform (FFT) is performed in the modem 160. During the manufacturing of an RFIC, an RFIC DC offset value, which makes a finally output signal minimum, is found through an iteration of such an operation.

Further, due to mismatching of an I channel path and a Q channel path of the transmission chain 110 of the RFIC, an image signal is generated in a carrier frequency of 1 MHz, which is referred to as IQ mismatch. Only one path is illustrated in FIGS. 1, 3, and 4 for convenience of explanation, but there are two paths (I and Q) within the transmission chain 110. In order to calibrate the IQ mismatch, the envelope detector 171 performs a calibration operation of emitting a sine wave of 2 MHz to the output of the reception chain 150 of the RFIC in proportion to an amplitude of the image signal in the output of the transmission chain 110 of the RFIC and making the amplitude of the image signal minimum through the FFT in the modem 160.

FIGS. 3A-3F illustrate IQ mismatch calibration of the transmission chain 110 of the RFIC, and a DC offset calibration apparatus and calibration process.

Figure 3A:
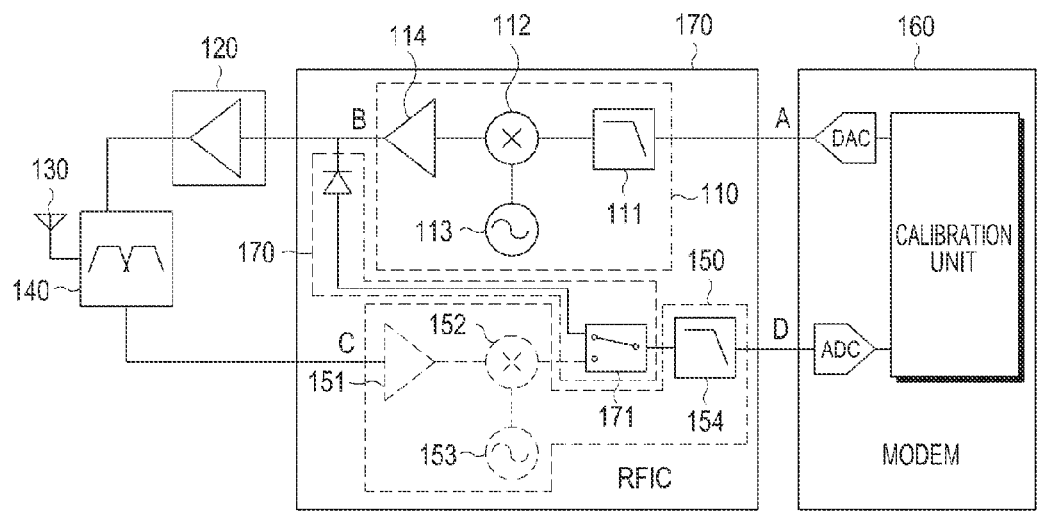
FIG. 3A is a schematic diagram illustrating IQ mismatch calibration of an Radio Frequency Integrated Circuit (RFIC) transmission chain, a Direct Current (DC) offset calibration apparatus, and a calibration process.
Figure 3B:
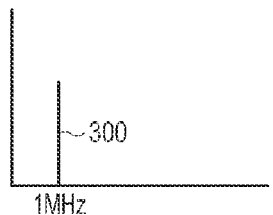
FIG. 3B is a graph illustrating a signal at point A in FIG. 3A before calibration.
Figure 3C:
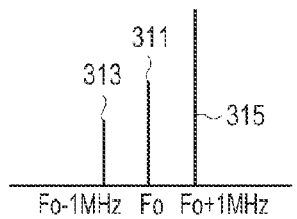
FIG. 3C is a graph illustrating a signal at point B in FIG. 3A before calibration.

Referring to FIG. 3A, for the calibration, the envelope detector 171 is turned on and an output signal of the transmission chain 110 is connected to an output of the reception chain 150. Further, for the calibration, a sine wave signal 300 of 1 MHz, in FIG. 3B, is applied to the RFIC from position A corresponding to an output of the modem 160. Then, a signal Fo 311, in FIG. 3C, output due to a leakage of an LO signal by a DC offset of the transmission chain 110, a desired signal Fo+1 MHz 315, and a signal Fo−1 MHz 313 corresponding to an image signal generated due to the IQ mismatching of the transmission chain 110 are output at position B corresponding to the output of the transmission chain 110. Accordingly, signals except for the desired signal Fo+1 MHz 315 should be removed. Particularly, the signal Fo 311 should be removed through DC offset calibration and the signal Fo−1 MHz 313 should be removed through IQ calibration.

Figure 3D:
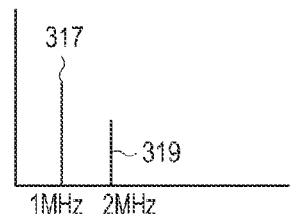
FIG. 3D is a graph illustrating a signal at point D in FIG. 3A before calibration.

Further, since the envelope detector 171 is in an on state, the sine wave of 1 MHz is transmitted to position D corresponding to the output of the reception chain 150 of the RFIC in proportion to the LO leakage amount, and a signal 317 of 1 MHz, in FIG. 3D, is output at position D and input into the modem 160. Accordingly, the modem 160 adjusts a DC offset value of the transmission chain 110 to minimize the signal 317.

Figure 3E:
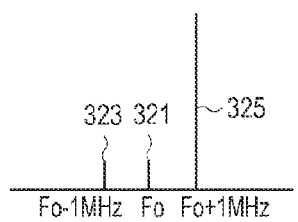
FIG. 3E is a graph illustrating a signal at point B in FIG. 3A after calibration.
Figure 3F:
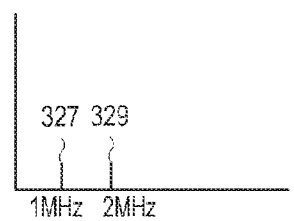
FIG. 3F is a graph illustrating a signal at point D in FIG. 3A after calibration.

Further, a sine wave of 1 MHz is transmitted to the output of the reception channel 150 of the RFIC through the envelope detector 171 in proportion to an amplitude of the image signal 313 in the output of the transmission channel 110, and a sine wave signal 319 of 2 MHz corresponding to a difference between the desired signal 315 and the image signal 313 is output at position D and input into the modem 160. Accordingly, the modem 160 performs an operation of adjusting phases and amplitudes of an I signal (i.e., amplitude of an In-phase carrier signal) and a Q signal (i.e., amplitude of a Quadrature-phase carrier signal) such that the image signal 313 is minimized. Then, after the calibration, signals 321, 323, and 325, in FIG. 3E, are output at position B and signals 327 and 329, in FIG. 3F, are output at position D.

In addition, the IIP2 calibration of the reception chain 150 of the RFIC, according to an embodiment of the present invention, uses the calibration method and circuit of the transmission chain 110. That is, when the IQ mismatch calibration and the DC offset calibration of the transmission chain 110 are completed, the envelope detector 171 is turned off and one of the I path and the Q path of a baseband circuit 111 of the transmission chain 110 is turned off. In this case, since the modem 160 is still in a state in which the sine wave signal of 1 MHz is applied to the RFIC, the IQ path is mismatched and thus the image signal at position B has a desired amplitude. Accordingly, with a one-tone sine wave signal of 1 MHz alone, a two-tone signal of 2 MHz is generated at the output of the transmission chain 110 of the RFIC. The two-tone signal is applied to the input of the reception chain 150 of the RFIC via a power amplifier 120 (PAM) and a Front End Module with Integrated Duplexer (FEMID) (e.g. antenna 130 and duplexer 140). Further, the IIP2 calibration may be performed by applying the sine wave signal of 2 MHz to the modem 160 from the output of the reception chain 150 of the RFIC and minimizing the 2 MHz signal via the FFT.

FIGS. 4A-4H illustrate an IIP2 calibration apparatus and calibration process of the reception chain 150 of the RFIC.

Figure 4A:
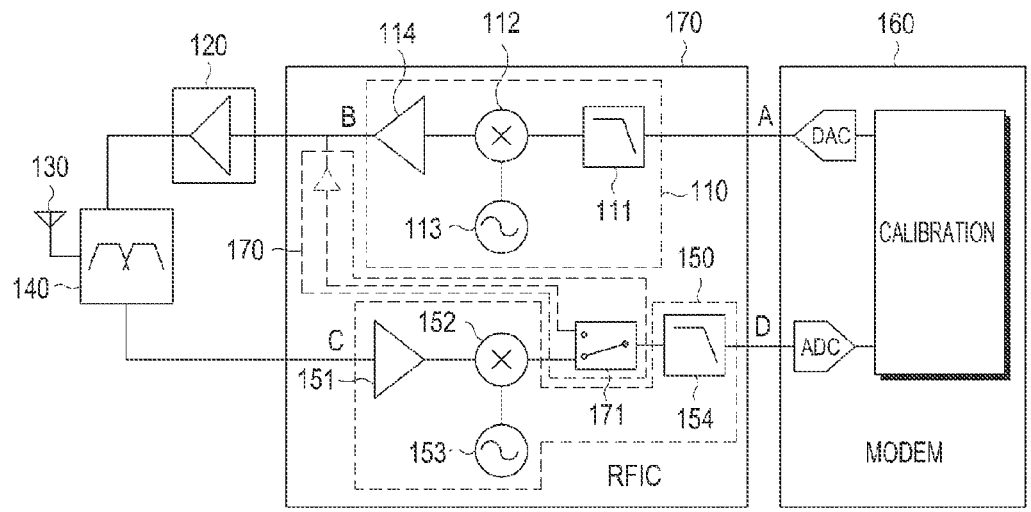
FIG. 4A is a schematic diagram illustrating an IIP2 calibration apparatus of an RFIC reception chain and a calibration process.
Figure 4B:
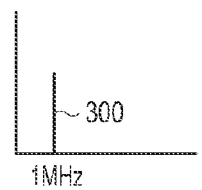
FIG. 4B is a graph illustrating a signal at point A in FIG. 4A before calibration.
Figure 4C:
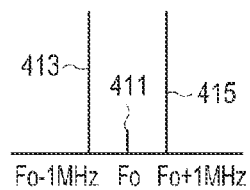
FIG. 4C is a graph illustrating a signal at point B in FIG. 4A before calibration.
Figure 4D:
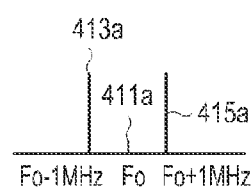
FIG. 4D is a graph illustrating a signal at point C in FIG. 4A before calibration.
Figure 4E:
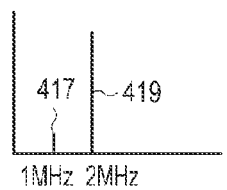
FIG. 4E is a graph illustrating a signal at point D in FIG. 4A before calibration.
Figure 4F:
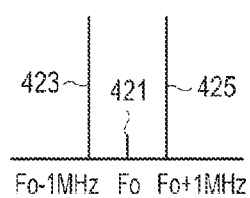
FIG. 4F is a graph illustrating a signal at point B in FIG. 4A after calibration.
Figure 4G:
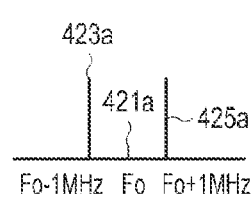
FIG. 4G is a graph illustrating a signal at point C in FIG. 4A after calibration.
Figure 4H:
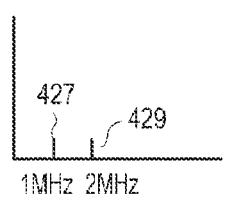
FIG. 4H is a graph illustrating a signal at point D in FIG. 4A after calibration.

Referring to FIG. 4A, when the IQ mismatch calibration and the DC offset calibration of the transmission chain 110 are completed for the calibration, the envelope detector 171 is turned off through a switch and one of the I path and the Q path of the baseband circuit 111 of the transmission chain 110. Then, the sine wave signal 300 of 1 MHz, in FIG. 4B, applied to position A in the modem 160 due to the IQ path mismatching generates signals 411, 413, and 415, in FIG. 4C, at position B via the transmission chain 110. That is, an image signal 413 has the same amplitude of that of a desired signal 415. As described above, according to the IQ path mismatch, with the one-tone sine wave 300 of 1 MHz, two-tone signals 413 and 415 are generated at the output of the transmission channel 110 of the RFIC. The two-tone signals are applied to the input of the reception chain 150 of the RFIC via the PAM 120 and the FEMID 130, 140. That is, signals 411*a*, 413*a*, and 415*a*, in FIG. 4D, at position C are applied to the reception channel 150. Further, the sine wave signals 413*a* and 415*a* are output at position D as a signal 419, in FIG. 4E, through the reception channel 150 of the RFIC. Finally, the modem 160 adjusts an IIP2 parameter value to minimize the signal 419 of 2 MHz, and accordingly, a signal 429, in FIG. 4H, results at position D after the calibration. Referring to FIGS. 4F and 4G, signal at point C and D after the calibration is same signal at point C and D before the calibration.

Figure 5:
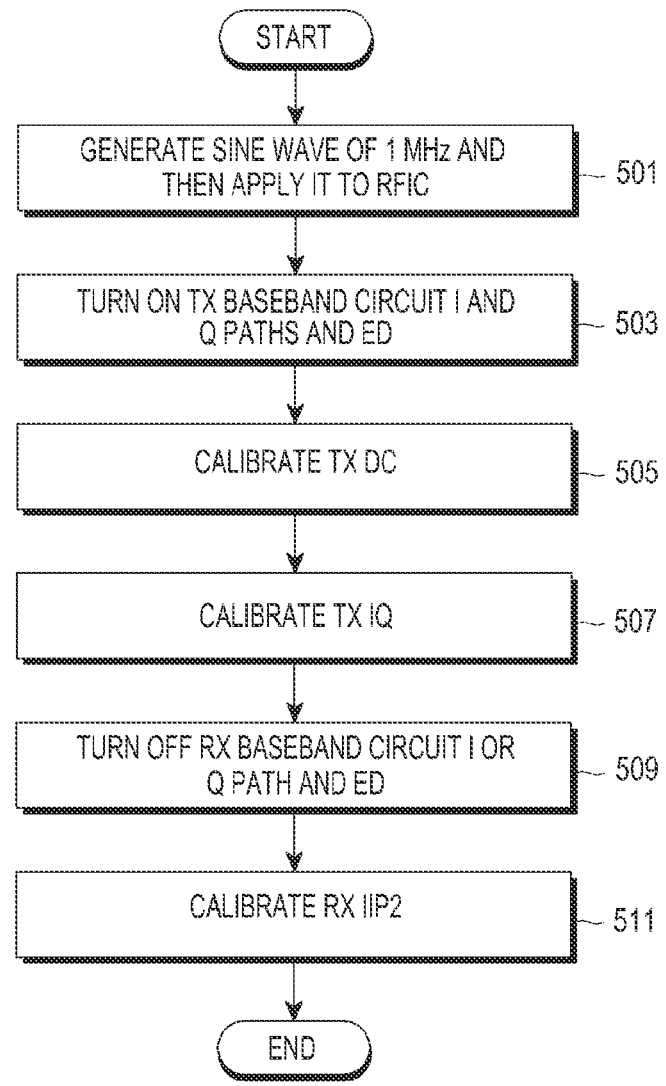
FIG. 5 is a flowchart illustrating an RFIC calibration process according to an embodiment of the present invention.

FIG. 5 is a flowchart illustrating an RFIC calibration process according to an embodiment of the present invention.

Referring to FIG. 5, a sine wave signal of 1 MHz is applied to the RFIC for the calibration in step 501. Further, for the calibration of the transmission channel 110, the Envelope Detector (ED) 171 is turned on and both the I path and the Q path of the baseband circuit 111 of the transmission channel 110 are turned on in step 503. In addition, a transmission DC offset value is calibrated to minimize an output signal of 1 MHz output of the reception channel 150 in step 505. Next, for the transmission IQ mismatch calibration, amplitudes and phases of an I signal and a Q signal are calibrated to minimize an image signal in step 507. When the transmission chain 110 calibration is completed, the ED is turned off and one of the I path and the Q path of the baseband circuit 111 of the transmission chain 110 is turned off for calibration of the reception chain 150 in step 509. Further, an IIP2 characteristic value is calibrated to minimize a signal of 2 MHz output from an output of the reception channel 150 in step 511.

According to embodiments of the present invention which are described above, a calibration can be performed using a leakage signal path from a transmission end to a reception end in a transmission apparatus of a terminal such as a modem-RFIC-PAM-FEMID. Accordingly, an IIP2 calibration can be performed such that the IMD2 component generated due to actual transmitted signal leakage and reception sensitivity deterioration due to the IMD2 component are minimized. Further, according to embodiments of the present invention, since the IIP2 calibration of a receiver can be performed using DC offset calibration and IQ mismatch calibration algorithms performed by a conventional transmitter, implementation of additional hardware or software is not required. In addition, according to embodiments of the present invention, since a compensation value generated by an IIP2 calibration performed during manufacturing of a terminal is stored in a memory without real time IIP2 calibration, the calibration can be performed at the time of manufacture and without a calibration circuit.

Embodiments of the present invention are shown and described in the specification and the drawings correspond to examples presented in order to easily explain technical contents of the present invention, and to help comprehension of the present invention, but are not intended to limit the scope of the present invention. That is, it is obvious to those skilled in the art to which the present invention belongs that different modifications can be achieved based on the scope and spirit of the present invention. Accordingly, all such modifications are intended to be included within the scope of the present invention, as defined in the claims, and their equivalents.

What is claimed is:

1. An apparatus for calibrating a terminal of a wireless communication system, the apparatus comprising:
   a modem;
   a transmission chain configured to process a signal input from the modem and transmit the processed signal via an antenna;
   a reception chain configured to process a signal received via the antenna and transmit the processed signal to the modem; and
   a connector configured to connect an output of the transmission chain and an output of the reception chain via an envelope detector and a switch configured to turn on/off the envelope detector, calibrate a DC offset voltage and I and Q signals of the transmission chain by inputting a one-tone signal of 1 MHz into the transmission channel via the modem in a state where the envelope detector is turned on, and calibrate a second order input intercept point (IIP2) characteristic value by adjusting the signal input into the modem via the reception channel.

2. The apparatus of claim 1, wherein the connector is further configured to generate a two-tone signal of 2 MHz from the one-tone signal of 1 MHz by turning off the envelope detector and turning off one of the I and Q signals.

3. The apparatus of claim 2, wherein the transmission channel is configured to transmit the two-tone signal of 2 MHz to an input end of the reception channel from an output end of the transmission channel.

4. The apparatus of claim 1, wherein the connector is further configured to adjust the IIP2 characteristic value to reduce the signal of 2 MHz input into the modem via the reception channel.

5. The apparatus of claim 2, wherein the connector is further configured to adjust the IIP2 characteristic value to reduce the signal of 2 MHz input into the modem via the reception channel.

6. A method of calibrating a terminal in a wireless communication system, the method comprising:
   applying a sine wave signal of 1 MHz to a transmission chain of the terminal via a modem;
   turning on an envelope detector to connect the transmission chain and a reception chain and calibrate a DC offset voltage, an I signal, and a Q signal of the transmission chain; and
   calibrating a second order input intercept point (IIP2) characteristic value by turning off the envelope detector and controlling a signal input into the modem via the reception chain.

7. The method of claim 6, wherein calibrating the IIP2 characteristic value comprises generating a two-tone signal of 2 MHz from a one-tone signal of 1 MHz by turning off the envelope detector and turning off one of the I signal and the Q signal of the transmission chain.

8. The method of claim 7, wherein calibrating the IIP2 characteristic value comprises applying the two-tone signal of 2 MHz to an input of the reception chain from an output of the transmission chain.

9. The method of claim 6, wherein calibrating the IIP2 characteristic value comprises adjusting the IIP2 characteristic value to reduce the signal of 2 MHz input into the modem via the reception chain.

10. The method of claim 7, wherein calibrating the IIP2 characteristic value comprises adjusting the IIP2 characteristic value to reduce the signal of 2 MHz input into the modem via the reception chain.

* * * * *